UNITED STATES PATENT OFFICE.

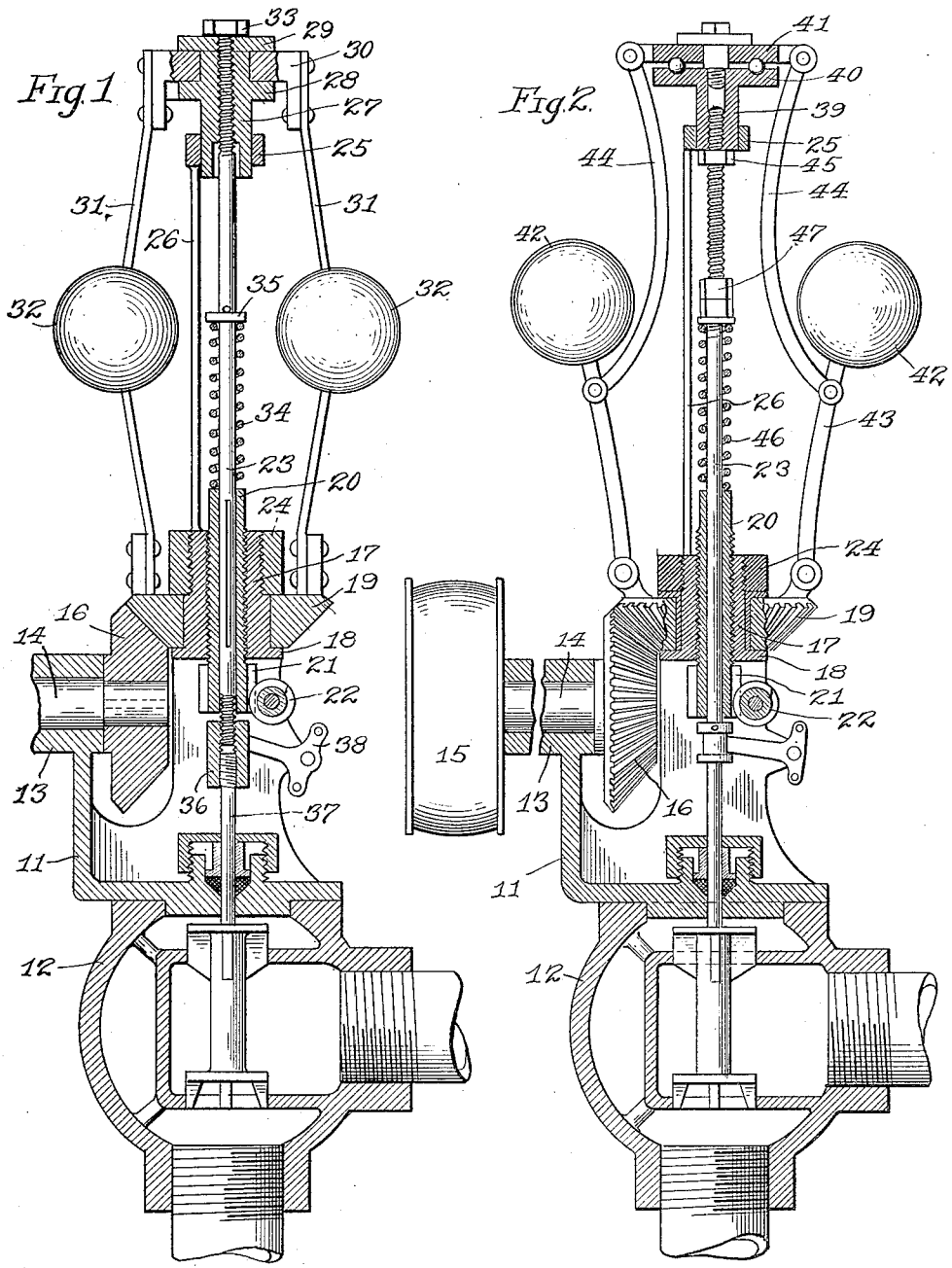

FREDERICK R. BRUGGER, OF LAKE CITY, IOWA.

STEAM-ENGINE GOVERNOR.

1,132,068.     Specification of Letters Patent.     Patented Mar. 16, 1915.

Application filed May 14, 1913. Serial No. 767,557.

*To all whom it may concern:*

Be it known that I, FREDERICK R. BRUGGER, a citizen of the United States, and a resident of Lake City, county of Calhoun, and State of Iowa, have invented new and useful Improvements in Steam-Engine Governors, of which the following is a specification.

The main objects of this invention are to provide a ball governor which can be easily and quickly adjusted for change in steam pressure and consequent change in speed; also to provide an arrangement of parts by which the governor can be adjusted by one operation; and further to provide a compact arrangement in which all of the adjusting parts are positioned directly on the valve stem of the governor, one in which the spring adjustment for sensitiveness of the governor is simultaneously operated and by the same means by which the opening of the valve is adjusted; and still further to provide an arrangement in which the relation of spring dimension, governor weights, valve area and lead of adjusting screw will be such that an adjustment of the adjusting screw for a different speed will automatically adjust the device to the proper sensitiveness. These and other features, advantages and capabilities of the invention will become apparent from a detailed description of the accompanying drawings showing two specific embodiments of the invention in which—

Figure 1 is an elevation in cross-section of one embodiment of the invention in which the governor balls are suspended by springs; and Fig. 2 is an elevation in cross-section of another embodiment in which the governor balls are pivoted to links and another means for adjusting for proper sensibility at the shop or by an expert is illustrated.

In the construction shown, a housing 11 is mounted on the valve casing 12. At the upper end of one side of the housing 11 is provided a journal member 13 in which the shaft 14 coöperates and is driven by the engine through pulley 15 mounted on the outer end of the shaft 14. On the other end of the shaft 14 is mounted a bevel gear 16 which projects inside of the housing 11. At the upper end of the housing 11 is fixed a collar 17 having a shoulder 18 at its lower end. A bevel gear 19 in mesh with bevel gear 16 is mounted to rotate on this collar 17 being positioned against the shoulder 18. A tubular extension 20 has screw-threaded engagement with the inside of the collar 17. At the lower end of this tubular extension 20 is provided a worm gear 21. A worm 22 in mesh with worm gear 21 is mounted in housing 11, and by means of this worm 22, the worm gear 21 is operated to adjust the device. The valve stem 23 extends through this tubular extension 20 and passes down into the valve casing 12 to there connect with the valve. A sleeve 24 having screw-threaded connection with the outside of the collar 17 is secured on the collar 17 immediately above the bevel gear 19 to keep the bevel gear in place. So far, the two embodiments shown in Figs. 1 and 2 are practically identical.

In the embodiment shown in Fig. 1, a sleeve 25 is fixed in position by a rod 26 which is fixed on collar 24. In this sleeve 25, the governor head 27 is adapted to slide up and down, being limited in its downward movement by a shoulder 28. Above this shoulder 28 and between it and a second shoulder 29, a bracket 30 is adapted to rotate freely. At about the middle of each of springs 31, 31, is provided a ball member 32, which is generally cast in two parts and clamped or bolted together on its spring. The bracket 30 is fixed to the upper end of the springs 31, 31, and the bevel gear 19 to the lower end of the springs 31, 31, thus when the bevel gear 19 is rotated from shaft 14, the bracket 30 and intermediately suspended ball members 32, 32, will simultaneously be rotated. The valve stem 23 is screw-threaded at its upper end into the governor head 27 and has a nut 33 secured at its extreme upper end above the governor head 27 to securely lock it in place. Thus, in the usual manner, when the governor balls 32, 32 are thrust outward by centrifugal force, in the operation of the device, the governor head will be pulled downward and with it the valve stem 23 to close the valve. To regulate the sensitiveness of the governor when the normal speed of the machine is changed, a coil spring 34 is provided encircling the valve stem, which spring is limited in its upward movement by an abutment 35. At its lower end the spring abuts against the upper edge of the tubular extension 20. The valve stem is made in two parts, which are held in alinement with one another by a collar 36 into which they are screw-threaded.

The lower part of the valve stem 37, in the present instance, is connected to the lever 38 which is used for temporarily opening the valve beyond normal. This lever 38 is shown ninety degrees out of correct position for convenience of illustration. The upper or main valve stem 23 is feathered to rotate with the tubular extension 20. Thus, it will be seen that when the adjusting tubular extension 20 is turned to move down with respect to the collar 17, it will turn with it, the valve stem 23 which at its lower end will turn down into the sleeve 36 to shorten the valve stem, and consequently the valve opening will be enlarged. The lead of the adjustable tubular extension has a definite fixed relation to that on the valve stem operating in the sleeve 36 and governor head 27. If the lead on the tubular extension is greater than on the valve stem, the tubular extension will travel down the valve stem faster than the valve stem will travel into the sleeve 36 and consequently the tension on the coil spring 34 will be decreased. Thus, the greater the opening of the valve, the less the tension on the coil spring and consequently greater sensitiveness of the governor to increase in speed. And vice versa, when the adjusting tubular extension will be turned upward, the valve stem will be lengthened to diminish the valve opening, and the tension on the coil spring will be increased to diminish the sensitiveness of the governor to increase in speed. Obviously, the lead on the tubular extension might be less or in the opposite direction than the lead on the valve stem and the scope of the invention would not be changed.

In the manufacture of the device, of course, it will be understood that the lead on the adjusting tubular extension with respect to the lead on the valve stem may be determined, with respect to the weight of the balls and the tension on the springs, etc., or vice versa. To facilitate attaining these proper relations, the lower part 37 of the valve stem has a screw-threaded connection with the sleeve 36 whereby to adjust the valve stem to its proper length. This sleeve 36 would in practice be adjusted in the shop.

The embodiment shown in Fig. 2 differs from the embodiment shown in Fig. 1 mainly in that another means are provided for regulating the novel adjusting means of this invention, and incidentally that pivoted links are used to suspend the balls instead of springs. Similar to the first embodiment, a sleeve 25 is fixed in position by a rod 26 which is fixed on collar 24. In this sleeve 25 a tubular extension 39 having a shoulder 40 is adapted to slide up and down in said sleeve. A circular member 41 is mounted to rotate on suitable bearings on the shouldered portion 40 of said tubular extension 39. Suitable means are provided to hold the circular member 41 in contact with said shouldered portion 40. Between the circular member 41, and the beveled gear 19, balls 42, 42, are suspended in the following manner, each ball to a pair of links: In the present instance, the ball is fixed to the upper end of the lower link 43, which is pivoted to the upper surface of the beveled gear 19. A second or upper link 44, is pivoted to the disk member 41 at one end and at its other end is pivoted to the link 43 at a point just below the ball 42, thus when the bevel gear 19 is rotated from shaft 14, the disk member 41 and intermediately suspended balls will be rotated simultaneously. Obviously, the arrangement of these links one to another may be changed and also the conformation of the links and size of balls changed, without altering in any way the scope of the present invention. The valve stem 23 is screw-threaded at its upper end into the collar 39. A nut 45 is secured to the lower end of the collar 39 on the valve stem 23. Thus, similar to the embodiment shown in Fig. 1, in the operation of the device, when the governor balls 42, 42 are thrust outward by centrifugal force, the circular member 41 will be pulled down and thereby press down the valve stem 23 into the valve casing 12 to close the valve. To regulate the sensitiveness of the governor in this embodiment, a coil spring 46 is provided encircling the valve stem 23 which spring is limited in its upward movement by two nuts 47, 47, which have a screw-threaded connection with the valve stem 23. At its lower end, the spring abuts against the tubular extension 20. In this embodiment, the valve stem is not feathered to rotate with the tubular extension 20. A sleeve 48 is secured to the lower part of the valve stem having a groove in which a lever 49 coöperates and similar to the embodiment shown in Fig. 1, this lever is used for temporarily opening the valve beyond normal. When regulating this device for sensitiveness at the shop, to diminish the opening of the valve, the nut 45 on the sleeve 39 is turned to move upward and thereby to press down the valve stem to diminish the size of opening of the valve, and then to adjust the tension of the coil spring 46, the nuts 47, 47 are turned to move upward the requisite distance. To change the speed and adjust for sensitiveness in the field, the same method is employed as in the first embodiment, namely the sleeve 20 is adjusted to move up or down. It will be seen in this embodiment, however, that when the tension on the spring 46 is reduced, the governor head will drop a distance thereby projecting out the governor balls from the valve stem and lowering the valve stem to decrease the opening of the valve. Consequently, when the device is in operation, at this adjustment, it will take a less distance for the balls to travel outward in order to close the valve than when the balls had to start from a position nearer to the valve stem, and vice versa.

With slight changes in the construction, the governors could be made so that the valve stem and valve would move upward when the balls move outward, and the present invention would not need to be changed.

While there are herein shown and described but two specific embodiments of the invention, it is to be understood that various changes, modifications and combinations of the two may be made by those skilled in the art without departing from the scope of the invention as defined in the appended claims.

Having thus described my invention, what I claim as new and desire to secure by Letters Patent is:

1. In a centrifugal speed governor, the combination with a valve stem and the valve carried thereby, of a centrifugal governor for closing the valve, means for normally holding the valve open, a worm gear carried by the valve stem, and means associated with the worm gear whereby the valve may be opened or closed independent of the centrifugal governor or means for normally holding the same open.

2. In a device of the character described, comprising a valve and a valve stem therefor in combination, with a centrifugal governor adapted to close said valve, means for normally holding the valve open, and means for rotating the valve stem whereby the valve may be opened and closed for the purpose specified.

3. In combination with a valve and a valve stem therefor, of a tubular member slidably connected to the valve stem, a sleeve carried by the tubular member for adjusting the stem, rotatable driving means mounted upon the sleeve, a centrifugal governor carried by the rotatable driving means for operating the valve stem, and a coil spring for holding the valve stem in a predetermined position.

4. In a device of the character described, a combination with a valve and a valve stem therefor, of a tubular member slidably connected to the valve stem, a sleeve carried by said tubular member, a flange carried by the valve stem, a coil spring encircling the said valve stem and interposed between the tubular member and said flange, means for adjusting said tubular member, rotatable driving means encircling said sleeve, and a centrifugal governor carried by the rotatable driving means for operating the valve stem against the tension of the coil spring for the purpose specified.

5. In a device of the character described, a combination with a valve and a valve stem therefor, a sleeve encircling the valve stem, rotatable driving means carried by the said sleeve, a governor head carried by the upper end of the valve stem, a vertical rod extending from said sleeve and having a bearing for the governor head, centrifugal governors for connecting the governor head with the rotatable driving means, and a coil spring encircling the valve stem for holding the valve in a predetermined position.

In witness whereof, I hereunto subscribe my name to this specification in the presence of two witnesses.

FREDERICK R. BRUGGER.

Witnesses:
I. V. CURRAN,
GUSTAV DREWS.

Copies of this patent may be obtained for five cents each, by addressing the "Commissioner of Patents, Washington, D. C."